US012791700B2

(12) United States Patent
Papadelis et al.

(10) Patent No.: US 12,791,700 B2
(45) Date of Patent: Nov. 10, 2026

(54) METHOD, APPARATUS AND SYSTEM FOR ESTIMATING A GROUND SURFACE MODEL OF A SCENE

(71) Applicant: Axis AB, Lund (SE)

(72) Inventors: Aras Papadelis, Lund (SE); Christoffer Kjellson, Lund (SE)

(73) Assignee: AXIS AB, Lund (SE)

( * ) Notice: Subject to any disclaimer, the term of this patent is extended or adjusted under 35 U.S.C. 154(b) by 191 days.

(21) Appl. No.: 18/984,292

(22) Filed: Dec. 17, 2024

(65) Prior Publication Data

US 2026/0118501 A1 Apr. 30, 2026

(30) Foreign Application Priority Data

Dec. 21, 2023 (EP) .................................... 23218998

(51) Int. Cl.
*G01S 13/86* (2006.01)
*G01S 13/89* (2006.01)

(52) U.S. Cl.
CPC ............ *G01S 13/867* (2013.01); *G01S 13/89* (2013.01)

(58) Field of Classification Search
CPC ........ G01S 13/867; G01S 13/89; G01S 13/06; G01S 13/91; G01S 13/42; G01S 13/933
USPC ............................................ 342/156, 52, 66
See application file for complete search history.

(56) References Cited

U.S. PATENT DOCUMENTS

| | | | | |
|---|---|---|---|---|
| 10,535,119 | B2 * | 1/2020 | Mercer | A61B 6/5258 |
| 10,898,757 | B1 * | 1/2021 | Johansson | A63B 24/0021 |
| 11,238,307 | B1 * | 2/2022 | Delay | G06F 18/22 |
| 11,302,071 | B1 * | 4/2022 | Boudreaux | G06T 17/05 |
| 11,504,582 | B2 * | 11/2022 | Johansson | A63B 24/0021 |
| 11,587,249 | B2 * | 2/2023 | Boudreaux | G06T 7/62 |
| 11,636,649 | B2 * | 4/2023 | Lieb | G06F 18/22 345/424 |
| 11,747,468 | B2 * | 9/2023 | Hucks | G01V 3/38 703/6 |
| 11,816,793 | B2 * | 11/2023 | Lieb | G06T 17/05 |
| 12,365,343 | B2 * | 7/2025 | Zhang | G01S 13/42 |

(Continued)

OTHER PUBLICATIONS

Nabiti et al., "Radar-Camera Sensor Fusion for Joint Object Detection and Distance Estimation in Autonomous Vehicles," arXiv:2009.08428v1 (Sep. 17, 2020).

(Continued)

*Primary Examiner* — Michael W Justice
(74) *Attorney, Agent, or Firm* — Volpe Koenig

(57) ABSTRACT

A method, an apparatus and a system for estimating a ground surface model of a scene in which a camera and a radar are arranged. The method comprises receiving a current estimate of a ground surface model, receiving radar detections indicative of azimuth angle and distance in relation to the radar, receiving camera detections indicative of a direction in relation to the camera and representing the radar detections and the camera detections in a common coordinate system. The method further comprises identifying (a radar detection and a camera detection which match each other, determining a point in a global coordinate system which is at the distance in relation to the radar indicated by the identified radar detection and in the direction in relation to the camera indicated by the identified camera detection, and updating the current estimate of the ground surface model in view of the determined point.

13 Claims, 6 Drawing Sheets

(56) References Cited

U.S. PATENT DOCUMENTS

| | | | | |
|---|---|---|---|---|
| 12,546,589 | B2 * | 2/2026 | Zhang | G01B 15/02 |
| 2018/0293445 | A1 | 10/2018 | Gao et al. | |
| 2020/0217950 | A1 | 7/2020 | Unnikrishnan et al. | |
| 2022/0091259 | A1 * | 3/2022 | Hucks | G06T 1/20 |
| 2022/0092812 | A1 * | 3/2022 | Boudreaux | G06V 10/82 |
| 2022/0092850 | A1 * | 3/2022 | Boudreaux | G06N 3/006 |
| 2022/0215619 | A1 * | 7/2022 | Lieb | G06T 17/05 |
| 2022/0215620 | A1 * | 7/2022 | Lieb | G06F 18/22 |
| 2022/0319328 | A1 | 10/2022 | Zhang et al. | |
| 2023/0050467 | A1 | 2/2023 | Govardhanam et al. | |
| 2023/0204755 | A1 * | 6/2023 | Liu | G01S 13/723 342/55 |
| 2023/0314594 | A1 * | 10/2023 | Campbell | G01S 13/886 342/55 |
| 2024/0028041 | A1 * | 1/2024 | Klaus | G01S 17/89 |
| 2024/0053464 | A1 * | 2/2024 | Dahnoun | G01S 13/886 |
| 2024/0203129 | A1 * | 6/2024 | Yang | G06V 20/56 |
| 2025/0033644 | A1 * | 1/2025 | Zhang | G01S 13/42 |
| 2025/0035436 | A1 * | 1/2025 | Zhang | G01B 15/02 |

OTHER PUBLICATIONS

Ogunrinde et al., "Deep Camera-Radar Fusion with an Attention Framework for Autonomous Vehicle Vision in Foggy Weather Conditions," Sensors (2023).

Singh et al., "Depth Estimation from Camera Image and mmWave Radar Point Cloud," pp. 9275-9285 (2023).

Extended European Search Report, European Patent Application No. 23218998.5 (May 27, 2024).

* cited by examiner

METHOD, APPARATUS AND SYSTEM FOR ESTIMATING A GROUND SURFACE MODEL OF A SCENE

TECHNICAL FIELD

The present invention relates to the field of estimating a ground surface of a scene. In particular, it relates to a method, an apparatus, and a system for estimating a ground surface model of a scene in which a camera and a radar are arranged.

BACKGROUND

Cameras are often used for surveillance purposes to monitor objects, such as persons or vehicles, in a scene. A camera is a two-dimensional sensor and provides information of direction, such as azimuth angle and elevation angle, of the object in relation to the camera. However, the camera provides no information of the distance to the object from the camera. A similar situation arises when a radar detects objects in a scene and provides object positions in two dimensions given by an azimuth angle and a distance of an object in relation to the radar. In that case, the radar provides no information of the elevation angle of the object in relation to the radar.

A known solution to tackle these problems is to assume that the ground in the scene is a flat and horizontal surface and that the detected objects in the scene are on that flat ground surface. With such an assumption it becomes possible to estimate a distance to an object detected by a camera, or an elevation angle of an object detected by the radar, provided that the installation position and orientation of the camera and the radar in the scene are known. Further, in a scene in which both a camera and a radar are arranged at known positions and orientations, the flat ground assumption makes it possible to transform object detections between the coordinate systems of the two sensors. For example, it becomes possible to transform an object detection specified as an azimuth angle and a distance in relation to the radar to a pixel position in an image plane of the camera, or vice versa.

However, the ground in a real-world scene often departs from a flat surface. As a result, the assumption that the ground is flat will lead to errors. For instance, it may lead to object detections from the radar being incorrectly placed in a vertical direction when mapped into the image plane of the camera. These errors will also be scene dependent since the flat ground assumption will be worse for some scenes than for others. Similar errors will also appear if the installation height of the radar and/or the camera above the ground is not measured correctly, even in the situation that the ground happens to be approximately flat. There is thus room for improvements.

SUMMARY OF THE INVENTION

In view of the above, it is thus an object of the present invention to mitigate the above problems stemming from the assumption that the ground surface in a scene is flat and provide a way of estimating a more accurate model of the ground surface in a scene. This object is achieved by the invention as defined by the appended independent claims. Advantageous embodiments are defined by the appended dependent claims.

The inventors have realized that it is possible to determine points which are located on the ground surface in the scene by using a camera and a radar which simultaneously detect objects in the scene. In each iteration of the method, one or more such points are determined and a current estimate of a ground surface model of the scene is updated in view of the determined point. Accordingly, the estimate of the ground surface model becomes more accurate with each iteration of the method.

To determine a point which is located on the ground surface, the idea is to identify a radar detection and a camera detection which likely are detections of the same physical object. Once that is done, the distance information from the radar and the directional information from the camera may be combined to determine a point in the "real world", i.e., as a coordinate in the global coordinate system with respect to which the ground surface model is defined. That point will be an estimate of a point located on the ground surface.

To find a radar detection and a camera detection which likely are detections of the same object, the radar detections and the camera detections are first represented in a common coordinate system. This is made possible by the current estimate of the ground surface model which allows the radar detections and the camera detections to be transformed between different coordinate systems. For example, the radar detections may be transformed to a coordinate system in which the camera detections are defined, or vice versa.

When represented in the common coordinate system, a matching procedure is carried out to identify radar detections and camera detections which match each other, i.e., which correspond to each other in that they are detections of the same physical object. Whether or not a radar detection and a camera detection match may be determined according to a predefined matching criterion. Notably, as the current estimate of the ground surface model may not yet perfectly model the ground surface, there may be a deviation between the radar detection and the camera detection in the common coordinate system even if they correspond to the same physical object. This will especially be true for earlier iterations of the method than for later iterations of the method, since each update of the ground surface model makes it more precise. Therefore, the matching criterion typically allows a certain deviation between the detections. Possibly, the allowable deviation may be larger for earlier iterations of the method than for later iterations of the method as the estimate of the ground surface model improves.

By a global coordinate system is meant a three-dimensional coordinate system which may be used to described positions in the scene. As such, it could also be referred to as a real-world coordinate system. It may be a three-dimensional cartesian coordinate system, although other options such as a spherical coordinate system may also be used.

By a ground surface model is meant a mathematical model which describes the ground surface in the scene. The ground surface model may model an elevation of the ground surface of the scene in relation to a plane in the global coordinate system. For example, it may describe a function $f:\mathbb{R}^2 \rightarrow \mathbb{R}$, which maps points in the plane to an elevation above the plane. The function $f$, which defines a surface in the scene, may be estimated from a collection of points in the global coordinate system which are located on the ground surface. Thus, estimating a ground surface model may include estimating points which are located on the ground surface. If may further include fitting a surface $f$ to those points.

By representing radar detections and camera detections in a common coordinate system is meant that the detections are expressed in terms of coordinates of the common coordinate system. In case the detections originally are expressed in another coordinate system, the representing may involve transforming the detection from the original to the common coordinate system. For instance, it may involve transforming radar detections from a local coordinate system of the radar to the global coordinate system or to a local coordinate system of the camera.

A radar detection of an object is generally indicative of an object position in relation to the radar given by an azimuth angle and a distance of the object in relation to the radar. In particular, the radar detection may be indicative of an azimuth angle and a distance to a point where the object meets the ground surface in the scene. A camera detection of an object is generally indicative of an object position in relation to the camera given by a direction of the object in relation to the camera. In particular, the camera detection may be indicative of a direction to a point where the object meets the ground surface in the scene. For instance, for a calibrated camera, a pixel coordinate of an object in an image captured by the camera is indicative of the direction of the object in relation to the camera. A radar and a camera detection may further be indicative of additional properties of the object, such as speed, acceleration, object class, object size, bounding box aspect ratio, etc. Some of these properties, including speed and acceleration, may be measured by tracking an object over time.

By the radar and camera detections being simultaneous is meant that they are detected at or near the same time. In other words, the radar and the camera detections coincide temporally. In particular, they are considered simultaneous if there is at most a predetermined time period between a time point when the radar detections were made and a time point when the camera detections were made. The predetermined time period is typically so small that the motion of the objects during that time period is negligible. The predetermined time period may take into account that the rate at which the radar provides detections and a rate at which the camera provides detections may be different so that there is no exact temporal correspondence between the camera and the radar detections. Specifically, the predetermined time period may correspond to the lowest of the rate of the camera and the rate of the radar. For example, if the camera provides detections every 30th ms and the radar every 40th ms, then the predetermined time period may be set to 40 ms.

By a radar detection and a camera detection matching each other is meant that the radar detection and the camera detection fulfil a predefined matching criterion. This matching criterion may be that a deviation measure of the radar detection and a camera detection is below a deviation threshold. The deviation measure may include a measure of distance between object positions in the common coordinate system. It may further include a measure of a deviation between one or more additional object properties. A radar detection and a camera detection which match each other may be said to be corresponding, meaning that they are detections of the same physical object.

The invention constitutes four aspects; a method, an apparatus, a system, and a computer-readable storage medium. The second, third, and fourth aspects may generally have the same features and advantages as the first aspect. It is further noted that the invention relates to all combinations of features unless explicitly stated otherwise.

BRIEF DESCRIPTION OF THE DRAWINGS

The above, as well as additional objects, features and advantages of the present invention, will be better understood through the following illustrative and non-limiting detailed description of embodiments of the present invention, with reference to the appended drawings, where the same reference numerals will be used for similar elements, wherein.

DETAILED DESCRIPTION OF EMBODIMENTS

The present invention will now be described more fully hereinafter with reference to the accompanying drawings, in which embodiments of the invention are shown.

Figure 1:
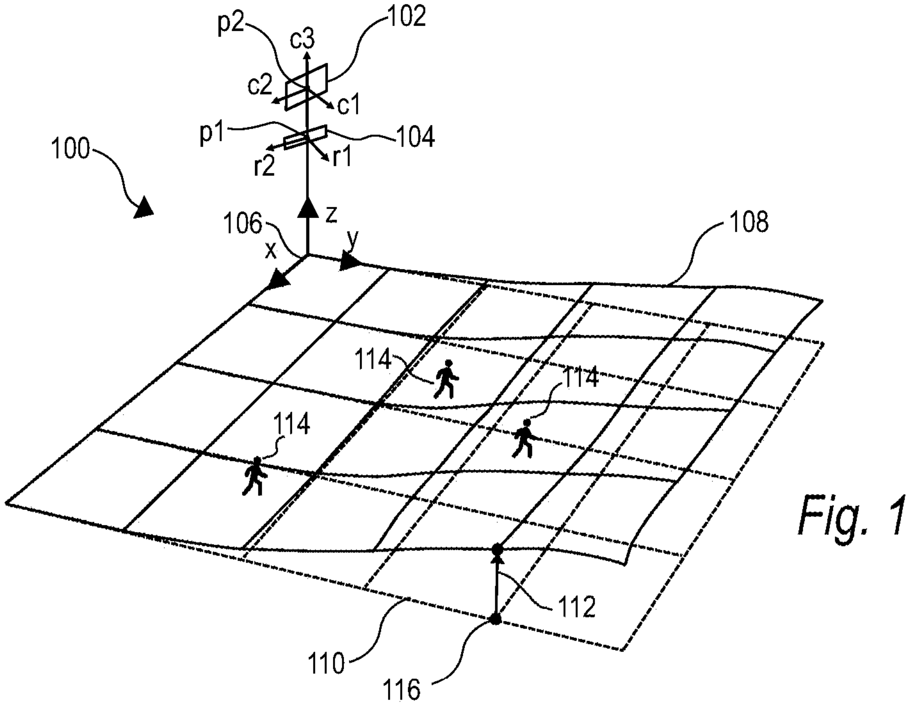
FIG. 1 illustrates a scene in which a camera and a radar are arranged.

FIG. 1 illustrates a scene 100 in which a camera 102 and a radar 104 are arranged. The camera 102 and the radar 104 are arranged such that they have an overlap between their fields of view, thus allowing them to simultaneously detect objects 114 in the scene 100. A three-dimensional coordinate system 106 is defined in the scene 100, herein referred to as a global coordinate system or a real-world coordinate system. The global coordinate system 106 may be a three-dimensional cartesian coordinate system with coordinate axes (x, y, z) as shown in FIG. 1. The global coordinate system 106, including its origin and orientation in the scene 100, may be freely defined. For example, it may be arranged as in FIG. 1 on the ground below the camera 102 and/or the radar 104. Another option may be to set the global coordinate system to be aligned with a local coordinate system of the camera 102 or the radar 104 described below.

In the scene 100, there is a ground surface 108 the shape of which is not known beforehand. On the ground surface 108 there may be objects 114, such as persons or vehicles, which simultaneously are detected by the camera 102 and the radar 104. The ground surface 108 may be described in terms of an elevation above a plane 110 in the scene 100, such as the x-y plane of the illustrated global coordinate system 106. The plane 110 may be a horizontal plane. Hence, the ground surface 108 may be described as a function $f$ which maps each point in the plane 110 to an elevation value. In the FIG. 1 example, the function $f$ maps each point (x, y) to an elevation given by $z=f(x, y)$. For instance, the point 116 is mapped by the function $f$ to a value which corresponds to the elevation 112. As will be described later on, the camera 102 and the radar 104 may be used to estimate a model of the ground surface 108 of the scene 100, i.e., it may be used to estimate the function $f$.

The camera 102 and the radar 104 are arranged at known positions and orientations in relation to the global coordinate system 106, i.e., in relation to the real world. This may also be referred to as the camera 102 and the radar 104 being extrinsically calibrated. In the illustrated example, the camera 102 and the radar 104 are both arranged along the z-axis of the global coordinate system 106, thereby making their x- and y-coordinates equal to zero and their z-coordinates corresponding to their respective installation heights above the origin of the global coordinate system 106. However, this relative position of the camera 102 and the radar 104 is not a prerequisite for the method described herein to work as long as the camera 102 and the radar 104 have overlapping fields of view so that they simultaneously are able to detect the same physical object. The positions and orientations may be measured during installation of the camera 102 and the radar 104. In FIG. 1, the camera 102 and the radar 104 are further shown as separate devices but they may also be integrated in a single device. When integrated in a single device, the relative positions and orientations of the camera 102 and the radar 104 may be more precisely controlled compared to if these parameters are measured by an installer on site.

In the FIG. 1 example, the radar 104 is arranged at a position p1 with coordinates (x1, y1, z1) in the global coordinate system 106, and the camera 102 is arranged at a position p2 with coordinates (x2, y2, z2) in the global coordinate system 106. The position p1 of the radar 104 may in this case correspond to the position of a predefined point of an antenna array of the radar 104, such as a center point of the antenna array. Similarly, the position p2 of the camera 102 may correspond to the position of an optical center of the camera 102. The orientations may be specified in terms of a viewing direction of each of the camera 102 and the radar 104, as well as an orientation of the camera sensor and the radar array around their respective viewing directions. For example, as illustrated in FIG. 1, the orientation of the camera may be given by a first vector c1 defining the viewing direction of the camera, and a second vector c2 describing a direction in which a first dimension of an image sensor of the camera 102 extends, such as a direction in which the rows of the image sensor extend. The viewing direction may correspond to the direction of the optical axis of the camera 102. The illustrated third vector c3 further describes the direction in which a second dimension, such as the columns, of the image sensor extends. Notably, since the vectors c1, c2 and c3 typically are orthogonal, it is enough to know two of them to define the orientation of the camera 102. Similarly, the orientation of the radar 104 may be given by a first vector r1 defining the viewing direction of the radar 104 and a second vector r2 describing a direction in which the antenna array of the radar 102 extends. The viewing direction of the radar 104 may in this case correspond to a main direction of the lobes of the antennas in the antenna array. The vectors c1, c2, c3, r1, r2 are all described with respect to the global coordinate system 106 and may be vectors of unit length.

Figure 2A:
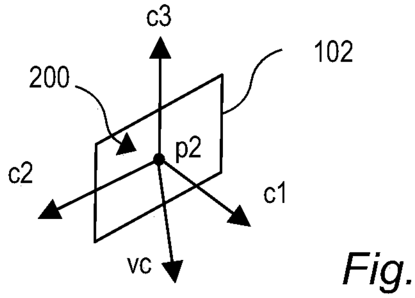
FIG. 2A illustrates a local coordinate system of the camera of FIG. 1.

The position p2 and the orientation vectors c1, c2, c3 define a local coordinate system 200 of the camera 102 as illustrated in FIG. 2A. As is known in the art, each pixel position on the image sensor of a camera may be transformed into a direction vc described in the local coordinate system of the camera by using a camera model and knowledge about the intrinsic parameters of the camera, such as its focal length and optical center. These parameters may be found from an intrinsic calibration of the camera. An example of a camera model is the classical pinhole model, but there are also more advanced models known in the art. When the camera is also extrinsically calibrated, i.e., its local coordinate system 200 has a known position and orientation in relation to the global coordinate system 106, the direction vc may be expressed as a direction in the global coordinate system. Accordingly, if an object has been detected at a certain pixel position in an image captured by the camera 102, the direction vc to the object expressed in the global coordinate system follows from the intrinsic and extrinsic calibration of the camera 102. The pixel position of the object in the image may therefore be said to be indicative of the direction vc of the object in relation to the camera.

The position p1 and the orientation vectors r1 and r2 define a local coordinate system 204 of the radar 104. The radar 104 includes an array 206 of antenna elements which extend in one dimension along the direction r2, i.e., it is a linear array. By using such an antenna array 206 it is possible to measure the distance to an object as well as directional information of the object, but only in the plane spanned by the orientation vectors r1 and r2. In more detail, suppose that the radar 104 detects an object 208 which is located at a position in relation to the coordinate system 204 given by a vector vr. The vector $vr_{proj}$ is the orthogonal projection of the vector yr on the plane spanned by vectors r1 and r2. The vector $vr_{proj}$ forms an angle $\theta_r$, referred to as an azimuth angle, with respect to the orientation vector r1 of the radar 104, and an angle $\varphi_r$, referred to as an elevation angle, with respect to the vector vr. By using the linear array 206, the radar 104 is able to measure the length of this vector, i.e., a distance dr=|vr| to the object. Further, the radar 104 is able to measure the azimuth angle $\theta_r$ or at least an approximation thereof, such as the so-called broad side angle. However, the radar 104 is not able to measure the elevation angle $\varphi_r$. The broad side angle is an angle which is equal to the azimuth angle $\theta_r$ for objects which are located at zero elevation angle but which differs slightly from the azimuth angle for objects with a non-zero elevation angle. For the purposes of this application, the terms azimuth angle and broad-side angle are considered equivalent. Thus, detections made by the radar 104 are indicative of the azimuth angle and the distance of an object in relation to the radar 104.

Figure 3:
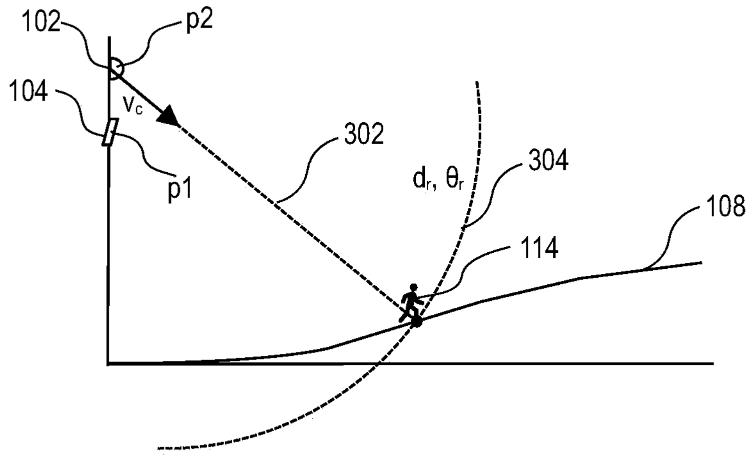
FIG. 3 shows a simplified two-dimensional side view of the scene of FIG. 1.

FIG. 3 illustrates an object 114 which is simultaneously detected by the camera 102 and the radar 104. For ease of illustration and explanation, FIG. 3 is shown as a simplified two-dimensional side view of the scene 100. As described above, the camera 102 provides a detection of the object which is indicative of the direction vc of the object 114 in relation to the camera 102, but not the distance of the object 114 in relation to the camera 102. Thus, from the camera detection it is known that the object 114 is located somewhere along a ray 302 extending in the direction vc from the position p2 of the camera 102. The radar 104 instead provides a detection of the object 114 which is indicative of the azimuth angle $\theta_r$ and distance dr of the object 114 in relation to the radar 104, but not the elevation angle. The distance dr and the azimuth angle $\theta_r$ define a circular arc 304, centered at position p1 of the radar 104, on which the object 114 is located. The dr, $\theta_r$ written next to the circular arc 304 in FIG. 3 is intended to reflect that these parameters together define the circular arc 304. Accordingly, neither the detection from the camera 102 nor the detection from the radar 104 is on its own enough to determine the three-dimensional position of the object 114 in the global coordinate system. However, this becomes possible if a model of the ground surface 108 in the scene 100 is known. In particular, from the radar detection the position of the object 114 may be determined as the point in the global coordinate system where the circular arc 304 intersects with the ground surface 108. Alternatively, from the camera detection the position of the object 114 may be determined as the point in the global coordinate system where the ray 302 intersects the ground surface 108. Having a model of the ground surface 108 also makes it possible to transform a radar detection to the coordinate system of the camera, and vice versa. For instance, it becomes possible to transform the distance dr and azimuth angle $\theta_r$ of a radar detection into a direction vc in relation to the camera by first finding the three-dimensional point on the ground surface that corresponds to the radar detection. The direction vc, in turn corresponds to a pixel position in an image coordinate system as explained above. In the following, it will be explained how to estimate such a model of the ground surface 108.

Figure 4:
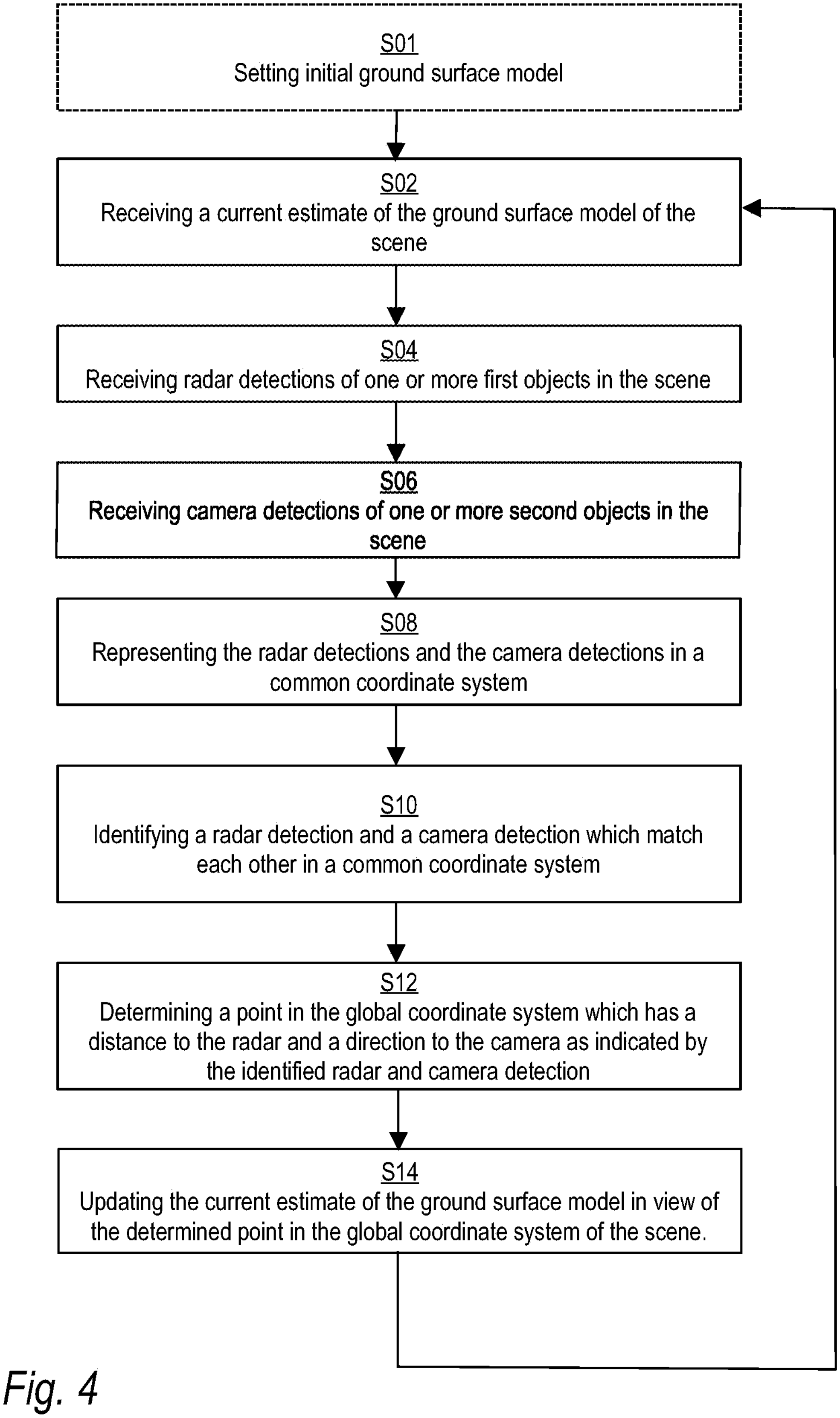
FIG. 4 is a flowchart of a method for estimating a ground surface model of a scene according to embodiments.

A method for estimating a ground surface model of a scene in which a camera and a radar are arranged at known positions and orientations in relation to a global coordinate system of the scene will now be described in more detail with reference to the flow chart of FIG. 4 and with further reference to FIG. 1.

The method describes one iteration of an iterative method. In each iteration, one or more points which are located on the ground surface are determined and used to update a current estimate of a ground surface model. The method may be iterated at a plurality of time points. For example, the method may be iterated each time, or at least at several times, when an object is detected by both the camera 102 and the radar 104 simultaneously. This may be continued until the ground surface model has converged, i.e., until further iterations do not lead to any improvement of the model. The steps of the method are thus set to be repeated so as to successively improve the ground surface model.

Step S01 is an initializing step which is performed the first time the method is to be used. In step S01, an initial state of the ground surface model is determined. As previously explained, the ground surface model may model an elevation of the ground surface 108 in the scene 100 in relation to a plane 110 in the global coordinate system 106. When initializing the ground surface model, any information which is known about the elevation of the ground surface may be used, such as if the elevation has manually been measured at some locations in the scene 100. However, if no such information is available, the initial state of the ground surface model may be set to an arbitrary elevation in relation to the plane 110. For example, in the initial iteration the current estimate of the ground surface model of the scene may be set to be equal to the plane 110 in the global coordinate system 106 in relation to which the elevation is modelled. In the example of FIG. 1, the plane 110 corresponds to the x-y plane of the global coordinate system 106. This means that the ground surface is initially assumed to be flat and is then updated iteratively according to the method.

Figure 6A:
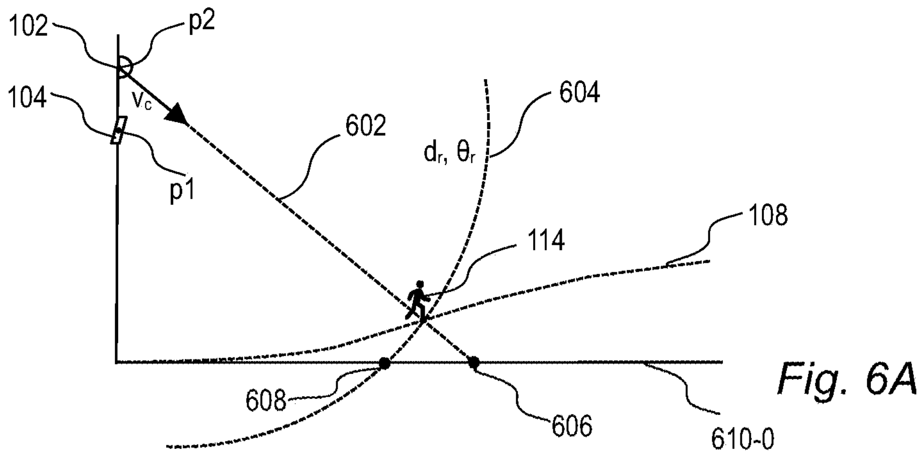
FIGS. 6A-6C illustrate how a current estimate of a ground surface model is updated during a first iteration of the method of FIG. 4.

In step S02, a current estimate of a ground surface model of the scene 100 is received, wherein the ground surface model is described in the global coordinate system 106 of the scene 100. The first time the method is performed, the current estimate of the ground surface model will be equal to its initial state described above in step S01. In the example of FIG. 6A, the solid line 610-0 represents the initial estimate of the ground surface model, whereas the actual ground surface is represented by the dashed line 108. For later iterations of the method, the current estimate of the ground surface model is the estimate provided by the previous iteration. The current estimate of the ground surface model hence reflects an estimation of the ground surface elevation at a certain point in time.

The ground surface model may generally model an elevation of the ground surface 108 in the scene 100 in relation to a plane 110 in the global coordinate system 106 such as the (x-y)-plane of the global coordinate system 106. The ground surface model may include a collection of points (xi, yi, zi), i=1 . . . N, which are described in the global coordinate system 106 of the scene 100. Each point in the collection defines an elevation above the plane 110. In this case, each point defines an elevation zi above the x-y plane of global coordinate system 106. As the method is iterated, more points are added to the collection. The current estimate of the ground surface model hence includes those points that were added to the collection in previous iterations of the method.

The ground surface model may further include a surface which is fitted to the collection of points. In particular, the surface may be fitted to the elevation values zi of the collection of points defining the elevation above the plane 110. Accordingly, the ground surface model provides a surface f(x,y) which estimates the elevation of the ground at position (x,y) in the x-y plane of the global coordinate system. The fitted surface may either interpolate the collection of points or smooth the collection of points. In the former case, the surface will pass exactly through the points, while this is not true for the latter case. The surface may be fitted to the collection of points using any known technique, including linear interpolation, spline interpolation, spline smoothing, etc.

Figure 8:
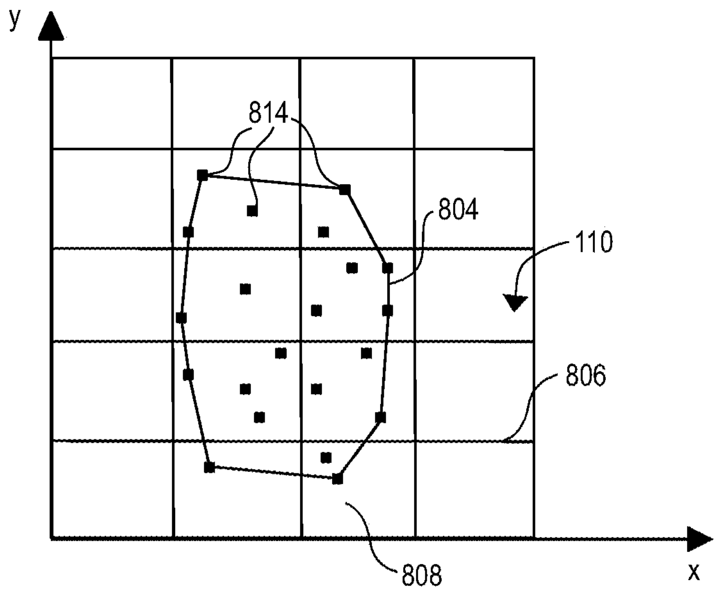
FIG. 8 shows the position of a collection of points in a grid view of the scene viewed by the camera and the radar.

In order to make the ground surface model more resilient against outliers among the determined points, representative elevation values, such as median or mean elevation values, calculated from subsets of the collection of points may be used when fitting the surface. In FIG. 8, (xi,yi)-coordinates of a collection of points 814 of a ground surface model are shown in the x-y plane 110 of the global coordinate system 106. A grid 806 with grid cells 808 may be defined in the plane 110, where a grid cell 808 may be 2×2 meter or similar. A representative elevation value may be calculated for a grid cell 808 from the elevation values zi of those points having their (xi, yi)-coordinates located in the grid cell 808. The representative elevation values calculated for the grid cells 808 may then form the basis for the surface fitting. Another way to make the ground surface model more resilient against outliers among the determined points is to require that a grid cell 808 includes more than a predefined number of points, such as ten points, from the collection in order for the elevation values zi of the points in the grid cell to be taken into account when fitting the surface.

The collection of points of the ground surface model will typically have a higher density of points in some areas of the scene 100 than in others. In areas of higher point density, it is possible to fit a surface to the points, for instance by interpolation. For areas with lower point density or even no points at all, the surface may instead be achieved by extrapolating from areas with higher presence. An area of higher density of points may be defined in terms of a convex hull of the collection of points in the plane 110 of the global coordinate system. In more detail, the collection of points may define a convex hull in the plane 110 of the global coordinate system 106, and the surface may include an interpolation of the collection of points inside the convex hull and an extrapolation of the collection of points outside the convex hull. In this way, it becomes possible to estimate a ground surface also in areas in the scene where the ground surface model includes no or a low density of points. This is further illustrated in FIG. 8 where the (xi, yi)-coordinates of the collection of points 814 define a convex hull 804 in the x-y plane 110 of the global coordinate system 106. As is known from mathematics, the boundary of the convex hull 804 of a set of points is the smallest convex polygon which contains the set of points. For (x,y)-points inside the convex hull 804, the ground surface model includes an interpolation between the elevation values zi of the collection of points 814. For (x,y)-points outside the convex hull 804, the ground surface model instead includes an extrapolation of the elevation values zi of the collection of points 814. For example, the elevation value z of a point (x, y) may be estimated as the (interpolated) elevation of the closest point on the boundary of convex hull 804.

Figure 2B:
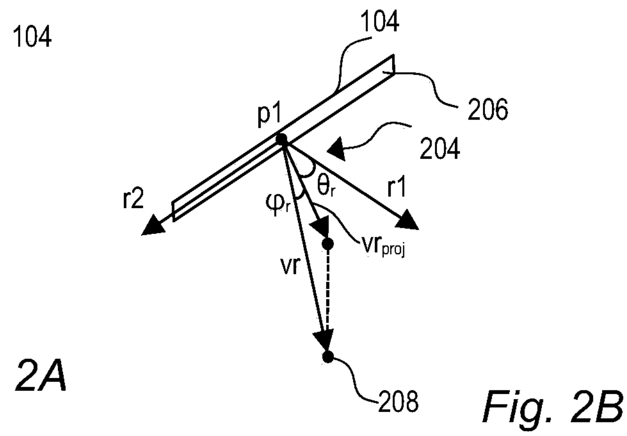
FIG. 2B illustrates a local coordinate system of the radar of FIG. 1.

In step S04 radar detections of one or more first objects in the scene 100 are received, wherein each radar detection is indicative of an azimuth angle $\theta_r$ and a distance dr of a respective first object in relation to the radar 104 as explained in connection to FIG. 2B. The radar detections hence include information which relates to the position of the first objects in relation to the radar 104. In addition to such position information, the radar detections may include information which is indicative of other properties of the first objects. This may include speed, acceleration, size, object class and historical information such as previous speed of a detected object.

In step S06 camera detections of one or more second objects in the scene 100 are received. The radar detections and the camera detections are simultaneous. This means that they were made at the same time point or that there is at most at a predefined time interval between them. Each camera detection is indicative of a direction vc of a respective second object in relation to the camera 102. The camera detections may for instance correspond to object detections made in an image captured by the camera 102 and may be given in terms of pixel coordinates of the object detections, such as pixel coordinates of bounding boxes of the object detections. As explained in connection to FIG. 2A, a pixel coordinate is indicative of a direction vc in relation to the camera. The camera detections hence include information which relates to the positions of the second objects in relation to the camera. In addition to such position information, the camera detections may include information which is indicative of other properties of the second objects. This may include speed, acceleration, aspect ratio, size, object class and historical information such as previous speed of a detected object. The speed and acceleration of an object may be achieved by tracking an object in a sequence of images, e.g., by using a Kalman filter algorithm. Since the camera 102 and the radar 104 are arranged in the same scene 100, there is typically an overlap between the one or more first objects and the one or more second objects, meaning that at least some objects are simultaneously detected by the camera 102 and the radar 104.

Figure 5A:
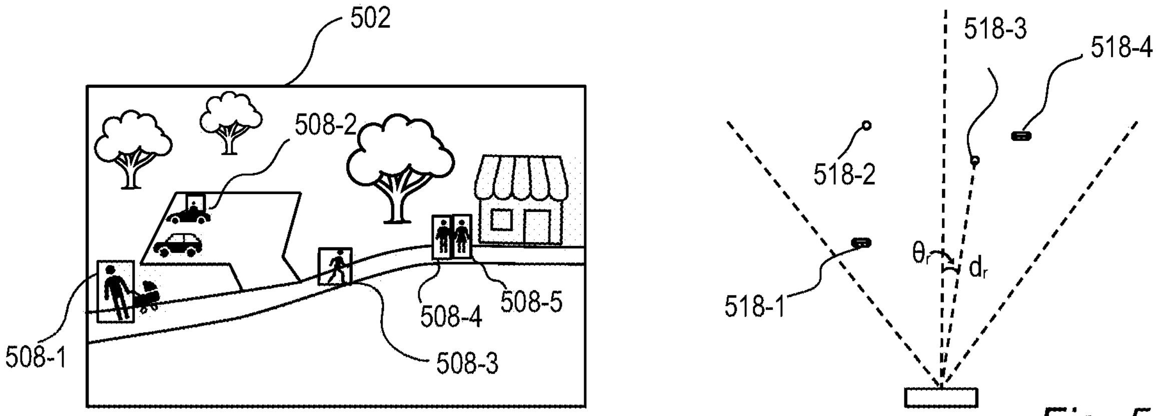
FIG. 5A illustrates simultaneous camera and radar detections in a scene.

Referring now to FIG. 5A where the scene viewed by the camera is depicted to the left and the same scene simultaneously viewed by the radar is depicted to the right. In the scene are several objects that may be detected by both the radar and the camera including humans and vehicles. For the purpose of describing embodiments of the present invention, only those objects that may be classified as humans are marked as having been detected by the camera and the radar in the figure, illustrated by black bounding boxes, 508-1-508-5, in the camera view. However, it should be understood that the camera and radar may also be able to detect and classify other types of objects including vehicles. In this example, the camera has in image 502 detected five objects, a person walking with a pram 508-1, another person 508-2 partly hidden by a car in a parking lot, a third person 508-3 walking, and two persons 508-4 and 508-5 standing close together near a house. The camera detections are illustrated by bounding boxes in the image 502. The radar has detected four objects, 518-1-518-4. The radar detections are shown in a radar coordinate system including an azimuth angle coordinate and a distance coordinate defined in relation to the radar. Notably, the two persons standing close together near the house are in too close proximity to each other to be distinguishable as two different objects by the radar and are instead detected as one larger object 518-4.

In step S08, by making use of the current estimate of the ground surface model and the known positions and orientations of the camera and the radar, the radar detections and the camera detections are represented in a common coordinate system. The common coordinate system may be one of the following: an image coordinate system of the camera including a first and a second pixel position coordinate in an image plane of the camera, a radar coordinate system of the radar including an azimuth angle and a distance coordinate defined in relation to the radar, and the global coordinate system of the scene. Optionally, in case the image coordinate system is used, it may be extended by a third coordinate which corresponds to the distance from the camera. Accordingly, the radar detections may be transformed to the image coordinate system, the camera detections may be transformed to the radar coordinate system, or both the radar detections and the camera detections may be transformed to the global coordinate system. Using the image coordinate system as the common coordinate system may be especially advantageous in cases where the camera has a lens, such as a fisheye lens, which introduces distortions in the image. For pixels in highly distorted areas of the image there is a high risk of transformation errors when transforming to other coordinate systems and therefore such transformations are preferably avoided. How to transform between the different coordinate systems will now be explained with reference to FIG. 6A which shows an object 114 which is located on the actual ground surface 108.

First suppose that a radar detection, which indicates the distance dr and the azimuth angle $\theta_r$ to the object 114, is to be transformed to a point in the global coordinate system. All points which have a distance dr to the radar 104 and have an azimuth angle $\theta_r$ in relation to the radar are located on a circular arc 604 which can be parametrized by the elevation angle $\varphi_r$ defined in relation to the radar 104. The dr, $\theta_r$ written next to the circular arc 604 in the figure is intended to reflect that these parameters together define the circular arc 604. Since the actual ground surface 108 is not known, an estimate of the position of the object 114 in the global coordinate system may be calculated as the point 608 where the circular arc 604 and the current estimate of the ground surface model 610-0 intersect. The intersection point 608 between the ground surface model 610-0 and the circular arc 604 can be determined directly if there exists a closed form solution for this intersection point. This depends on the mathematical function used to model the ground surface. If a closed form solution does not exist, an iterative method may be used where different values of the elevation angle Dr successively are tested until one finds an elevation angle which, when combined with the distance dr and the azimuth angle $\theta_r$, maps to a point in the global coordinate system which is located on or at least within a threshold elevation from the current estimate of the ground surface model 610-0. As a result, the radar detection may be said to be extended to be further indicative of an estimated elevation angle, which is estimated by using the current estimate of the ground surface model. Further, this extended radar detection may be mapped to the global coordinate system, i.e., described as a coordinate in the global coordinate system, by using the known position and orientation of the radar 104. Notably, the estimated elevation angle deviates from the true elevation angle due to the deviation between the current estimate of the ground surface 610-0 and the actual ground surface 108.

Next suppose that the radar detection is to be transformed to the image coordinate system. Then a direction in the global coordinate system from the position p2 of the camera 102 and the intersection point 608 may be calculated. By using the intrinsic and extrinsic calibration of the camera the calculated direction may be mapped to an image coordinate in the image coordinate system of the camera. Thus, in this case the mapping further makes use of the known position and orientation of the camera 102.

In a similar way, a camera detection, which indicates the direction vc from the camera to the object 114 may be transformed to a point in the global coordinate system. In this case, an estimate of the position of the object 114 in the global coordinate system may be calculated as the point 606 where a ray 602 extending from the camera 102 in the direction vc intersects the current estimate of the ground surface model 610-0. Again, the intersection point 606 between the ground surface model 610-0 and the ray 602 may be determined directly if there exists a closed form solution for this intersection point. This depends on the mathematical function used to model the ground surface. If a closed form solution does not exist, an iterative method may be used where different distances from the camera in the direction vc are tested until a distance dc is found which together with the direction vc maps to a point in the global coordinate system which is located on or at least within a threshold elevation from the current estimate of the ground surface model 610-0. As a result, the camera detection may hence be said to be extended to be further indicative of an estimated distance, which is estimated by using the current estimate of the ground surface model. Further, this extended camera detection is mapped to the global coordinate system by using the known position and orientation of the camera 102.

The camera detection may further be transformed to the radar coordinate system by mapping the intersection point 606 to the radar coordinate system. In order to do so, a distance dr and a direction yr in the global coordinate system from the position p1 of the radar 104 and the intersection point 606 may be calculated. By using the known position and orientation of the radar 104, the azimuth angle $\theta_r$ in relation to the radar may be derived from the direction vr. Thus, in this case the mapping further makes use of the known position and orientation of the radar 104.

To sum up, depending on which common coordinate system is used, the step of representing includes at least one of: a) extending the radar detections to be further indicative of estimated elevation angles of the one or more objects in relation to the radar, wherein the elevation angles are estimated from the current estimate of the ground surface model, and mapping the extended radar detections to the common coordinate system using at least the known position and orientation of the radar; b) extending the camera detections to be further indicative of estimated distances of the one or more objects in relation to the camera, wherein the distances are estimated by using the current estimate of the ground surface model, and mapping the extended camera detections to the common coordinate system by using at least the known position and orientation of the camera. Option a) is to be used when the image coordinate system has been selected as the common coordinate system, option b) when the radar coordinate system has been selected as the common coordinate system and both options a) and b) when the global coordinate system has been selected as the common coordinate system.

Figure 5B:
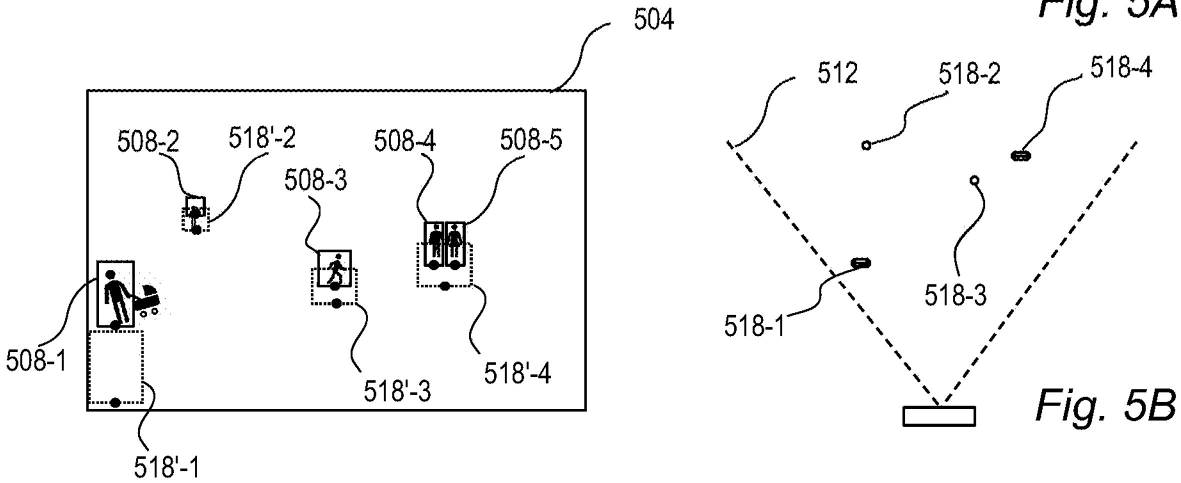
FIG. 5B illustrates the camera and radar detections of FIG. 5A when represented in the image coordinate system of the camera.

FIG. 5B illustrates an embodiment where the radar detections 518-1-518-4 and the camera detections, 508-1-508-5 are both represented in the image coordinate system of the camera. The bounding boxes with dotted lines depict detections from the radar represented in the image coordinate system while the bounding boxes with black continuous lines depict detections from the camera that are already present in the image coordinate system as seen in camera view of FIG. 5A. As shown by the black point on each bounding box, the radar detections 518-1-518-4 and the camera detections 508-1-508-5 may each be associated with a representative pixel position. Preferably, the representative pixel position corresponds to a position where the object meets the ground as this is the point with the highest importance for estimating the ground surface model using the described method. For example, the representative pixel position may be selected as the center pixel position of the bottom line of the bounding box. Notably, there may be a positional deviation between the objects detected by the camera and objects detected by the radar, as can be seen by the misalignment between the bounding boxes of the objects detected by the radar and the camera respectively. The positional deviation, particularly the vertical deviation, may be a result of the current estimate of the ground surface model not yet having a high enough accuracy and thus not reflecting the true elevation of the ground in the scene. An increasing number of iterations of the method will improve the ground surface model of the scene which in turn will cause this positional deviation to decrease.

In step S10, a radar detection and a camera detection which match each other in the common coordinate system are identified. In order to do so, each camera detection 508-1-508-5 may for example be compared to each radar detection 518'-1-518'-4, or at least a subset thereof, to determine if they match. During this process one or more matching pairs of radar and camera detections may be identified. To exemplify, camera detection 508-3 may be found to match with radar detection 518'-3 and hence they are identified in step S10. Radar detection 518'-1 may be found to not match with any camera detection and is therefore not identified in step S10. The determination of whether or not a radar detection and a camera detection match may be done according to a predefined matching criterion which in turn could include some form of deviation measure. Specifically, a radar detection and a camera detection may be determined to match each other in case a deviation measure between the radar detection and the camera detection when represented in the common coordinate system is below a deviation threshold. The deviation measure allows the deviation between two detections to be quantified, thus providing a measure of how close or similar two detections are.

The deviation measure may be a measure of a positional deviation between the radar detection and the camera detection in the common coordinate system, such as a distance measure between the position of the radar detection and the camera detection in the common coordinate system. The distance measure may be the L2-norm. For example, referring to FIG. 5B, the deviation measure may measure the distance between the representative pixel positions of the radar detection and the camera detection.

As mentioned above, a radar and a camera detection may not only be indicative of the position of an object, but may further be indicative of additional properties of the object. For example, each radar detection may further be indicative of a speed of a respective first object and each camera detection may further be indicative of a speed of a respective second object. The speed of the second object may be estimated by tracking the second object in a sequence of images captured by the camera. The speed of the first object may be measured by the radar and/or it may be estimated by tracking the first object over time in a sequence of radar measurements. Since the radar typically is only able to measure object speed in its radial direction, the latter may facilitate comparison to the estimated speed of the object detected by the camera. The additional properties are not limited to speed, but may also include object class, size, aspect ratio, acceleration and, if available, historical information such as previous speed of a detected object. Properties pertaining to historical information may be related to object detection tracks from previous image frames captured by the camera and radar. In such situations, the deviation measure may further include a measure of deviation of one or more of the additional properties. In particular, the deviation measure may include a measure of deviation in speed between a first object associated with the radar detection and a second object associated with the camera detection. For instance, the deviation measure may be calculated as a weighted sum of the positional deviation and the deviation between one or more additional properties. The different properties may be given different weights when added together depending on, for example, their importance or relevance in the current scene. These weights may be applied according to the following example formula:

$$\delta = \gamma 1|pc1 - pr1| + \gamma 2|pc2 - pr2| + \gamma 3|pc3 - pr3|$$

where $\delta$ is the deviation measure, $\gamma$ is the weight applied to a given property, prx is the property from the radar detection and pcx is the property from the camera detection. By including additional object properties in the matching, the risk is reduced of erroneously matching radar and camera detections which are detections of different physical objects.

A suitable deviation threshold may be set based on historically observed deviation measures between radar and camera detections that are known to correspond to the same object and deviation measures between radar and camera detections that that are known to correspond to different objects. For example, the deviation threshold may be set to a value that, for the historical data, gives a desired balance between true positive identifications (i.e., radar and camera detections that are known to correspond to the same object and correctly are identified as such since their deviation measures are below the deviation threshold), and false positive identifications (i.e., radar and camera detections that are known to correspond to different object but erroneously are identified as corresponding to the same object because their deviation measures are below the deviation threshold). The deviation measure may be evaluated when the ground surface model is set to its initial state. When the radar and camera detections are compared to each other it may happen that non-unique matches are found, such as a radar detection which matches with more than one camera detection or vice versa. By way of example, the radar detection 518'-4 in FIG. 5B may be found to match with both camera detections 508-4 and 508-5. In that case, the radar detection and the matching camera detections are preferably not identified in step S10. That is, in some embodiments, a radar detection and a camera detection are only identified to match each other if the camera detection is the only camera detection that matches the radar detection or the radar detection is the only radar detection that matches the camera detection. In this way, the method becomes more robust against uncertain matches. In an alternative embodiment, when multiple matches are found for a radar or a camera detection, the match with the shortest deviation measure is identified in step S10.

Figure 5C:
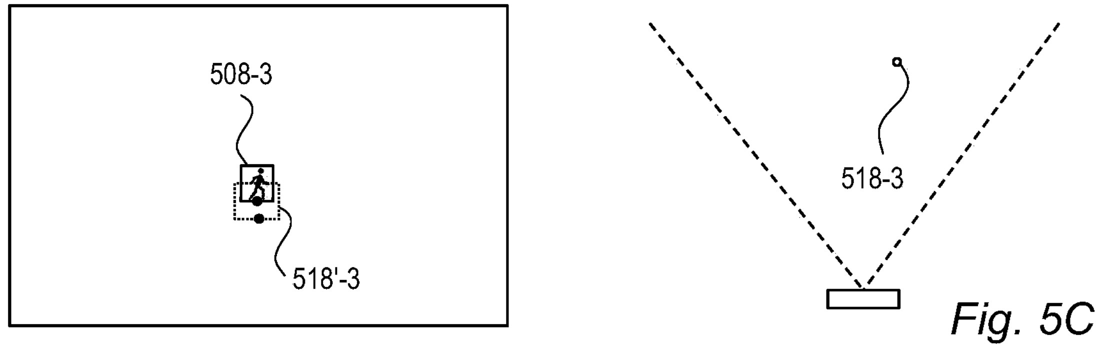
FIG. 5C illustrates a camera and a radar detection from FIG. 5B which are identified as matching each other in the image coordinate system of the camera.

Further, in order to provide an estimation of the ground surface model that is as true to the actual ground elevation as possible, it may be beneficial to restrict what type of detections that shall be used when matching detections from the radar and camera and sieve out those that may not be of as much use or that may even introduce errors instead of improving the ground surface model. This may be done by keeping only those camera detections that are associated with objects identified as being of a predefined object class and having an aspect ratio in an image captured by the camera which is consistent with that predefined object class. Returning to the example of FIG. 5B, the camera detections 508-1-508-5 are associated with a representative pixel position which corresponds to the position where the detected object is perceived to touch the ground surface. However, for detected objects that are partially occluded, this representative pixel position may not always reflect the actual point where the detected object touches the ground surface in the scene. This is true for object 508-2 detected by the camera, which is partially occluded by a parked car. The representative pixel position of detected object 508-2, as perceived by the camera, in reality corresponds to a point in the upper body of the actual detected person and not the point where the person touches the ground. Using this detection in the described method would introduce an error as the actual position where the object meets the ground, i.e., the feet of the detected person, is not in the same position as the representative pixel position perceived by the camera. The camera has no way of knowing that the perceived representative pixel position does not correspond to the actual point where the detected object touches the ground. However, the aspect ratio of this detection does not match the aspect ratio of a typical human, which provides information that there may be something peculiar about this particular detection. Therefore, in some embodiments the camera detection 508-2 is not included when performing the matching. For instance, all such detections may be removed prior to step S10. All other objects detected by the camera as illustrated in FIG. 5B have an aspect ratio corresponding with objects classified as humans and would thus be kept with regards to the aspect ratio matching criterion. However, returning to the example of FIG. 5B, no match is found for radar detection 518'-1 and camera detection 508-1 while the radar detection 518'-4 finds two possible matches in camera detections 508-4 and 508-5. All of these detections will therefore be sieved out according to the selected matching criteria leaving only camera detection 508-3 which has found a match in 518'-3 as illustrated in FIG. 5C.

When one or more matching camera and radar detections have been identified, the method proceeds to estimate one or more points which are located on the ground surface in the scene. To estimate such a point, the directional information from the camera detection may be combined with the distance information from the matching radar detection. In more detail, in step S12 a point in the global coordinate system 106 may be determined which is at the distance in relation to the radar indicated by the identified radar detection and in the direction in relation to the camera indicated by the identified camera detection. This step may be carried out for each matching pair of radar and camera detections. In some cases, the azimuth angle from the radar may further be taken into account when estimating the point which is located on the ground surface. For example, one may determine a point which is at the distance and the azimuth angle in relation to the radar indicated by the identified radar detection and having an elevation angle in relation to the radar which is derived from the direction indicated by the identified camera detection. Accordingly, a point in the global coordinate system which is located on the ground surface may be estimated by combining at least the distance in relation to the radar indicated by the identified radar detection and the direction in relation to the camera indicated by the identified camera detection.

Figure 6B:
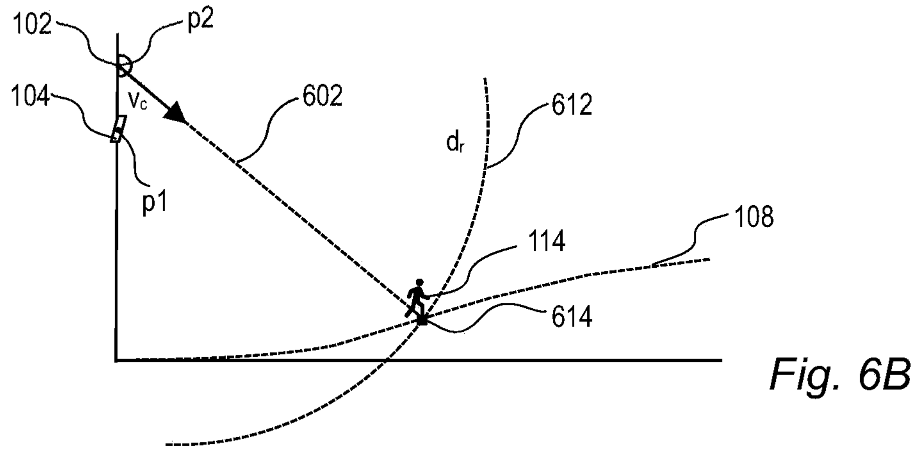

Turning to the example of FIG. 6B, it is assumed that the radar detection of object 114 and the camera detection of the object 114 were identified in step S10 to match each other. The radar detection indicates that the object 114 is at distance dr from the radar 104, and thus located somewhere on a sphere 612 with radius dr and centered at the position p1 of the radar 104 as illustrated in FIG. 6B. FIG. 6B is a simplified two-dimensional view explaining why the sphere 612 is rather illustrated as a circular arc. The dr written next to the sphere 612 in the figure is intended to reflect that the sphere is defined by the distance dr sphere. The camera detection indicates that the object 114 is in the direction vc from the camera 102, and hence that the object 114 is located along the ray 602 extending from the camera position p2 in the direction vc as shown in FIG. 6B. Accordingly, a point which is at a distance dr from the radar 104 and in a direction vc from the camera 102 may be determined as the point 614 where the ray 602 intersects the sphere 612. The determination of the point 614 may include finding the intersection between the sphere 612 and the ray 602. How to do that is generally known in the art. In brief, the sphere 612 is described by the equation $\|x-p1\|^2=dr^2$ and the ray 602 is described by the equation $x=p2+dc\cdot vc$, $dc>0$. Here $x=(x, y, z)$ is a coordinate in the global coordinate system, p1 is the position of the radar 104, $p^2$ is the position of the camera 102, vc is the direction of the ray 604, all expressed in the global coordinate system, and dr and dc are the distances from the radar 104 and the camera 102, respectively. By substituting x in the equation for the sphere with the expression for x from the equation for the ray 602, a second order equation expressed in the unknown distance dc is obtained. By solving the second order equation for dc, and then inserting the resulting dc in the equation for the ray 602, the coordinates of the point 614 are obtained. When solving the second order equation, it could happen that no valid solution is obtained. That is an indication that the radar and the camera detection were incorrectly matched, i.e., that they do not correspond to the same object. If instead two valid solutions are found, meaning that the ray 602 intersects the sphere 612 in two points, the point that best matches the azimuth angle indicated by the radar detection is selected. The resulting point, 614, is thus determined to be the point in the global coordinate system where the object 114 is actually located.

In the next step, S14, the current estimate of the ground surface model is updated in view of the determined point in the global coordinate system of the scene. If more than one point was determined in step S14, the ground surface model is updated in view of each determined point. As described in more detail above, the ground surface model may include a collection of points in the global coordinate system of the scene. The updating of the ground surface model may include adding the determined point 614 to the collection of points. Each point which is added to the collection serves to improve the model of the ground surface. The addition of new points to the collection of points may further trigger calculation of new representative elevation values for the grid cells 808 shown in FIG. 8. Moreover, the ground surface model may include a surface which is fitted to the collection of points. Updating the ground surface model may further include updating the surface after the determined point in the global coordinate system has been added to the collection of points. For example, an updated surface may be fitted to the collection of points by interpolation, smoothing and extrapolation as previously explained. The fitted surface allows a ground surface elevation to be estimated in the whole scene 100 and not only in the determined points 614. As was also described in connection to FIG. 8, it is in some embodiments required that the number of points in a grid cell 808 exceeds a predefined number in order for them to have an impact on the fitted surface. In such embodiments, the surface may be updated on a condition that the determined point in the global coordinate system belongs to a grid cell in the plane of the global coordinate system in which there are more than a predefined number of points from the collection of points.

Figure 6C:
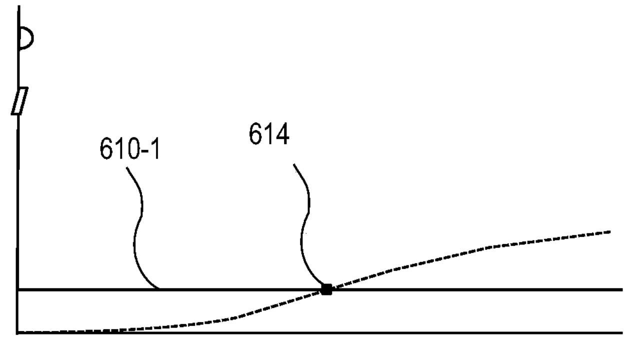

Continuing with the example from above in connection with FIGS. 6A and 6B, FIG. 6C shows an updated estimation 610-1 of the ground surface model in view of the point determined in the previous step S12. Since the exemplified iteration of the method is the first iteration, the updated estimate of the ground surface model will only include the points, in this case the single point 614, determined in the first iteration. By extrapolating a surface from this single point 614, the updated estimate of the ground surface model 610-1 will now still be flat but at an elevation value indicated by the point 614, as shown in FIG. 6C.

Figure 7A:
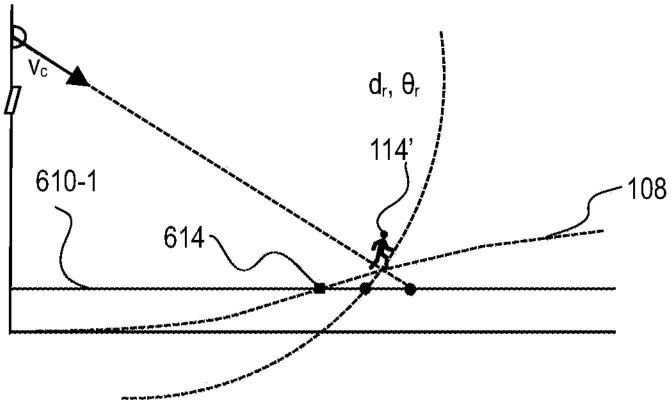
FIGS. 7A-7D illustrates how a current estimate of a ground surface model is updated during further iterations of the method of FIG. 4.
Figure 7B:
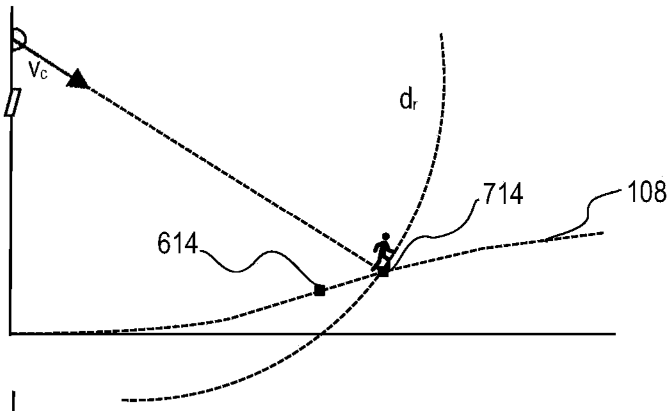
Figure 7C:
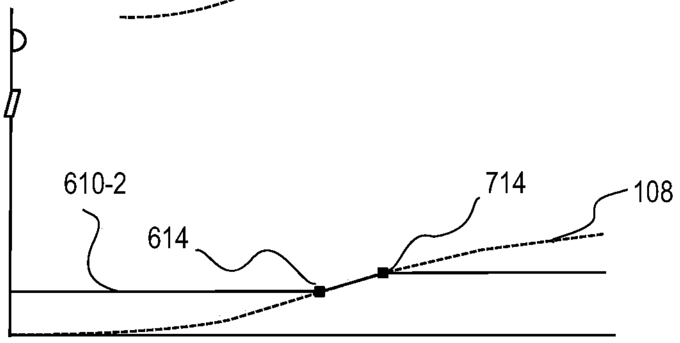

The first iteration of the method has now been completed and an updated estimate 610-1 of the ground surface model has been obtained which will now be used as input for further iterations of the method. A new iteration may be triggered at a later point in time when one or more objects have been detected by the radar and the camera simultaneously. Each iteration of the method will improve the estimate of the ground surface model as will now be demonstrated in connection with FIGS. 7A-7D continuing with the previously established example of FIGS. 6A-6C. A second iteration of the method has been triggered as illustrated in FIG. 7A where a new matching radar detection dr, Dr and camera detection vc of object 114' has been identified using the current estimate of the ground surface model 610-1. Further, a point 714 in the global coordinate system has been determined, as illustrated in FIG. 7B, indicating an estimated point on the actual ground surface 108. The ground surface model is then updated in view of determined point 714 in the global coordinate system as illustrated in FIG. 7C; thus the estimated ground surface model 610-2 now includes both points 614 and 714. Further, the ground surface model 610-2 includes a surface fitted to the two points 614 and 714, which in this case is achieved by interpolation and extrapolation of the elevation of the two points 614, 714.

Figure 7D:
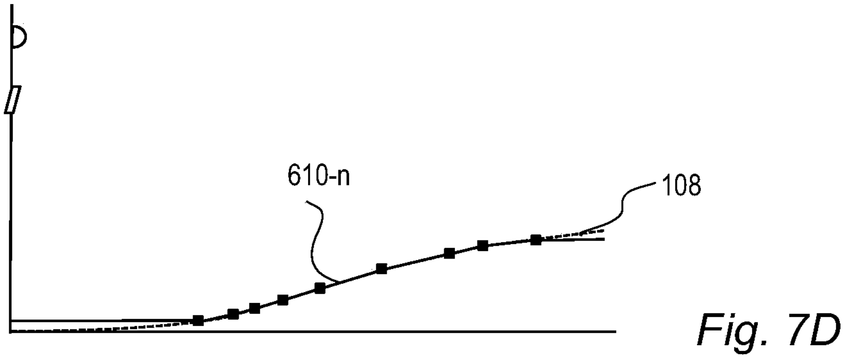

Further iterations of the method will update and gradually improve the estimated ground surface model in view of more points. FIG. 7D illustrated the estimated ground surface model 610-*n* after n iterations. At a certain point in time, the ground surface model may reach a state in which further detections may only provide very slight improvements to the ground surface model, or none at all. At this point, the ground surface model may have reached a state in which it almost perfectly models the ground surface and an option may then be to terminate the iteration of the method.

Figure 9:
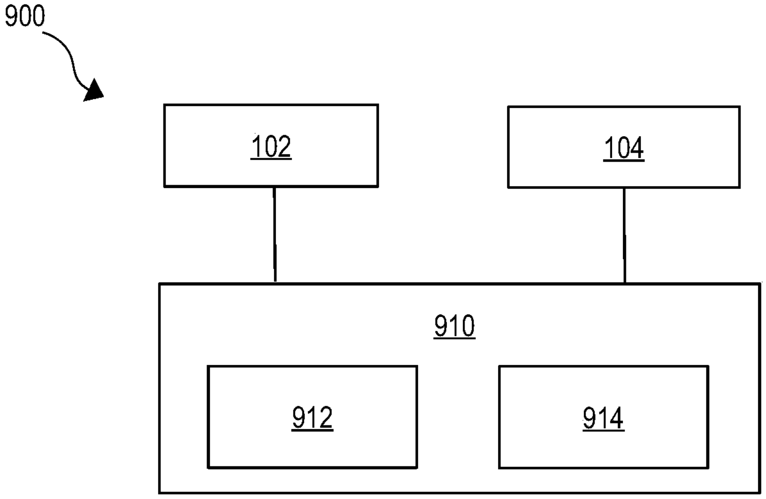
FIG. 9 schematically illustrates a system for estimating a ground surface model of a scene according to embodiments.

FIG. 9 illustrates a system for estimating a ground surface model of a scene. The system includes a camera 102, a radar 104, and an apparatus 910 which is configured to receive detections from the camera 102 and the radar 104, for instance over a wired or wireless connection. The apparatus 910 may be provided as a separate unit, or it may be integrated in either the camera 102 or the radar 104. In one embodiment, the camera 102, the radar 104, and the apparatus 910 are all provided in one unit.

The radar 104 is configured to make detections of one or more first objects in the scene, wherein each detection made by the radar is indicative of an azimuth angle and a distance of an object in relation to the radar. For instance, the radar 104 may be a frequency modulated continuous wave (FMCV) radar having a linear array of receive antennas. The camera 104 is configured to simultaneously with the radar make detections of one or more second objects in the scene, wherein each detection made by the camera is indicative of a direction of an object in relation to the camera. The radar 104 and the camera 102 may be arranged at known positions and orientations with respect to a global coordinate system of the scene. Further, the camera 102 and the radar 104 may be arranged with overlapping fields of view, thus allowing them to simultaneously detect an object which is present in the scene.

The apparatus 910 includes circuitry 912 which is configured to carry out any method described herein for estimating a ground surface model of a scene in which a camera and a radar are arranged at known positions and orientations in relation to a global coordinate system of the scene. The circuitry or processing circuitry may include general purpose processors, special purpose processors, integrated circuits, ASICs ("Application Specific Integrated Circuits"), conventional circuitry and/or combinations thereof which are configured or programmed to perform the disclosed method. Processors are considered processing circuitry or circuitry as they include transistors and other circuitry therein. In the disclosure, the circuitry is hardware that carry out or is programmed to perform the recited method. The hardware may be any hardware disclosed herein or otherwise known which is programmed or configured to carry out the recited functionality. When the hardware is a processor which may be considered a type of circuitry, the circuitry is a combination of hardware and software, the software being used to configure the hardware and/or processor. In more detail, the processor may be configured to operate in association with a memory 914 and computer code stored on the memory. The steps of the method described herein may correspond to portions of the computer program code stored in the memory 914, that, when executed by the processor, causes the apparatus 910 to carry out the method steps. Thus, the combination of the processor, memory, and the computer program code causes the apparatus 910 to carry out the method described herein. The memory may hence constitute a (non-transitory) computer-readable storage medium, such as a non-volatile memory, comprising computer program code which, when executed by a device having processing capability, causes the device to carry out any method herein. Examples of non-volatile memory include read-only memory, flash memory, ferroelectric RAM, magnetic computer storage devices, optical discs, and the like.

It will be appreciated that a person skilled in the art can modify the above-described embodiments in many ways and still use the advantages of the invention as shown in the embodiments above. For example, radar and camera detections for which no matches were found in a current iteration may be stored in a database. The method may then return to match these detections in a later iteration of the method when the ground surface model has been updated. In the later iteration, it is possible that matches are found among the stored detections due to the updated ground surface model, and the found matches may be used to retroactively determine points which are located on the ground surface. Thus, the invention should not be limited to the shown embodiments but should only be defined by the appended claims. Additionally, as the skilled person understands, the shown embodiments may be combined.

The invention claimed is:

1. A method for estimating a ground surface model of a scene in which a camera and a radar are arranged at known positions and orientations in relation to a global coordinate system of the scene, wherein the ground surface model models an elevation of a ground surface in the scene in relation to a plane in the global coordinate system, comprising:

setting an initial estimate of the ground surface model of the scene to be equal to the plane in the global coordinate system in relation to which the elevation is modelled, iterating the following steps at a plurality of time points:

receiving a current estimate of a ground surface model of the scene, wherein in an initial iteration the current estimate of the ground surface model is the initial estimate of the ground surface model, and in later iterations the current estimate of the ground surface model is provided by a previous iteration, receiving radar detections of one or more first objects in the scene, wherein each radar detection is indicative of an azimuth angle and a distance of a respective first object in relation to the radar, receiving camera detections of one or more second objects in the scene, wherein the radar detections and the camera detections are simultaneous, and wherein each camera detection is indicative of a direction of a respective second object in relation to the camera, representing, by making use of the current estimate of the ground surface model and the known positions and orientations of the camera and the radar, the radar detections and the camera detections in a common coordinate system, identifying a radar detection and a camera detection which match each other in the common coordinate system, determining a point in the global coordinate system which is at the distance in relation to the radar indicated by the identified radar detection and in the direction in relation to the camera indicated by the identified camera detection, and updating the current estimate of the ground surface model in view of the determined point in the global coordinate system of the scene.

2. The method of claim 1, wherein a radar detection and a camera detection match each other in case a deviation measure between the radar detection and the camera detection when represented in the common coordinate system is below a deviation threshold.

3. The method of claim 2, wherein the deviation measure includes a measure of deviation in speed between a first object associated with the radar detection and a second object associated with the camera detection.

4. The method of claim 1, wherein a radar detection and a camera detection are only identified to match each other if the camera detection is the only camera detection that matches the radar detection or the radar detection is the only radar detection that matches the camera detection.

5. The method of claim 1, further comprising:

keeping only those camera detections that are associated with objects identified as being of a predefined object class and having an aspect ratio in an image captured by the camera which is consistent with that predefined object class.

6. The method of claim 1, wherein the ground surface model includes a collection of points in the global coordinate system of the scene, and wherein updating the ground surface model includes adding the determined point in the global coordinate system to the collection of points.

7. The method of claim 6, wherein the ground surface model further includes a surface which is fitted to the collection of points, wherein updating the ground surface model further includes updating the surface after the determined point in the global coordinate system has been added to the collection of points.

8. The method of claim 7, wherein the ground surface model models an elevation of a ground surface in the scene in relation to a plane in the global coordinate system, wherein the collection of points defines a convex hull in the plane of the global coordinate system, and wherein the surface includes an interpolation of the collection of points inside the convex hull and an extrapolation of the collection of points outside the convex hull.

9. The method of claim 1, wherein the common coordinate system is one of the following:

an image coordinate system of the camera including a first and a second pixel position coordinate in an image plane of the camera, a radar coordinate system of the radar including an azimuth angle and a distance coordinate defined in relation to the radar, and the global coordinate system of the scene.

10. The method of claim 9, wherein, depending on which common coordinate system is used, the step of representing includes at least one of:

a) extending the radar detections to be further indicative of estimated elevation angles of the one or more objects in relation to the radar, wherein the elevation angles are estimated from the current estimate of the ground surface model, and mapping the extended radar detections to the common coordinate system using at least the known position and orientation of the radar, b) extending the camera detections to be further indicative of estimated distances of the one or more objects in relation to the camera, wherein the distances are estimated by using the current estimate of the ground surface model, and mapping the extended camera detections to the common coordinate system by using at least the known position and orientation of the camera.

11. An apparatus for estimating a ground surface model of a scene in which a camera and a radar are arranged at known positions and orientations in relation to a global coordinate system of the scene, wherein the ground surface model models an elevation of a ground surface in the scene in relation to a plane in the global coordinate system, comprising circuitry configured to carry out a method comprising:

setting an initial estimate of the ground surface model of the scene to be equal to the plane in the global coordinate system in relation to which the elevation is modelled, iterating the following steps at a plurality of time points:

receiving a current estimate of a ground surface model of the scene, wherein in an initial iteration the current estimate of the ground surface model is the initial estimate of the ground surface model, and in later iterations the current estimate of the ground surface model is provided by a previous iteration, receiving radar detections of one or more first objects in the scene, wherein each radar detection is indicative of an azimuth angle and a distance of a respective first object in relation to the radar, receiving camera detections of one or more second objects in the scene, wherein the radar detections and the camera detections are simultaneous, and wherein each camera detection is indicative of a direction of a respective second object in relation to the camera, representing, by making use of the current estimate of the ground surface model and the known positions and orientations of the camera and the radar, the radar detections and the camera detections in a common coordinate system, identifying a radar detection and a camera detection which match each other in the common coordinate system, determining a point in the global coordinate system which is at the distance in relation to the radar indicated by the identified radar detection and in the direction in relation to the camera indicated by the identified camera detection, and updating the current estimate of the ground surface model in view of the determined point in the global coordinate system of the scene.

12. The apparatus of claim 11, further comprising:

a radar configured to make detections of one or more first objects in the scene, wherein each detection made by the radar is indicative of an azimuth angle and a distance of an object in relation to the radar, and a camera configured to simultaneously with the radar make detections of one or more second objects in the scene, wherein each detection made by the camera is indicative of a direction of an object in relation to the camera, and whereby the apparatus is configured to receive the detections from the radar and the camera.

13. A non-transitory computer-readable storage medium comprising computer program code which, when executed by a device with processing capability, causes the device to carry out a method for estimating a ground surface model of a scene in which a camera and a radar are arranged at known positions and orientations in relation to a global coordinate system of the scene, wherein the ground surface model models an elevation of a ground surface in the scene in relation to a plane in the global coordinate system, the method comprising:

setting an initial estimate of the ground surface model of the scene to be equal to the plane in the global coordinate system in relation to which the elevation is modelled, iterating the following steps at a plurality of time points:

receiving a current estimate of a ground surface model of the scene, wherein in an initial iteration the current estimate of the ground surface model is the initial estimate of the ground surface model, and in later iterations the current estimate of the ground surface model is provided by a previous iteration, receiving radar detections of one or more first objects in the scene, wherein each radar detection is indicative of an azimuth angle and a distance of a respective first object in relation to the radar, receiving camera detections of one or more second objects in the scene, wherein the radar detections and the camera detections are simultaneous, and wherein each camera detection is indicative of a direction of a respective second object in relation to the camera, representing, by making use of the current estimate of the ground surface model and the known positions and orientations of the camera and the radar, the radar detections and the camera detections in a common coordinate system, identifying a radar detection and a camera detection which match each other in the common coordinate system, determining a point in the global coordinate system which is at the distance in relation to the radar indicated by the identified radar detection and in the direction in relation to the camera indicated by the identified camera detection, and updating the current estimate of the ground surface model in view of the determined point in the global coordinate system of the scene.

* * * * *